United States Patent [19]

Leuchs

[11] 3,943,087
[45] Mar. 9, 1976

[54] FIREPROOF SELF EXTINGUISHING COMPOSITION

[75] Inventor: Ottmar Leuchs, Hannover-Bothfeld, Germany

[73] Assignee: Kabel-und Metallwerke Gutehoffnungshuette AG, Germany

[22] Filed: Jan. 25, 1971

[21] Appl. No.: 109,390

Related U.S. Application Data

[63] Continuation-in-part of Ser. No. 823,033, May 8, 1969, abandoned.

[30] Foreign Application Priority Data

May 11, 1968 Germany............................ 1769343

[52] U.S. Cl.......  260/30.6 R; 260/42.47; 260/42.49; 260/45.7 R
[51] Int. Cl.$^2$.......................................... C08K 5/49
[58] Field of Search..... 260/41, 41.5, 45.7 R, 42.47, 260/42.49, 30.6 R

[56] References Cited

UNITED STATES PATENTS

| | | | |
|---|---|---|---|
| 2,357,725 | 9/1944 | Bennett............................ | 260/41 R |
| 2,674,546 | 4/1954 | Greenhalgh et al................ | 260/41 R |
| 2,687,394 | 8/1954 | Somermeyer...................... | 260/41 R |
| 3,053,802 | 9/1962 | Piacente.......................... | 260/45.7 R |
| 3,084,135 | 4/1963 | Scullin............................ | 260/41 R |
| 3,147,232 | 9/1964 | Norman et al................... | 260/45.7 R |

OTHER PUBLICATIONS

Catton–The Neoprenes (du Pont) (Wilmington, Del.) (1953), pp. 6 and 18.

Chevassus et al.–The Stabilization of Polyvinyl Chloride (Arnold), (London) (1963), p. 103.

Sorum–Fundamentals of General Chemistry (Prentice-Hall), (2nd Ed.), (Englewood Cliffs, N.J.) (1963), p. 501.

Penn, *PVC Technology,* pp. 70, 132, 133, 148, 149, 156, 394, (Maclaren, 1966).

Chevassus, et al. *The Stabilization of Polyvinyl–Chloride,* pp. 35–49 (St. Martin's Press, 1963).

Damusis, *Sealants* pp. 241, 242 (Reinhold, 1967).

*Primary Examiner*—Donald E. Czaja
*Assistant Examiner*—H. H. Fletcher
*Attorney, Agent, or Firm*—Marn & Jangarathis

[57] ABSTRACT

A polymeric composition having a polymer content which tends to evolve deleterious acid compounds upon being subjected to elevated temperatures; the composition including selected particle matter which is present in an amount to combine with or otherwise neutralize essentially the entire evolved deleterious compound when the composition is subjected to elevated temperatures; the composition with or without plasticizers being useful as insulation or jacketings for electric wire and cable, as well as diverse molded or extruded products, including disposable items such as packaging or the like.

12 Claims, 2 Drawing Figures

INVENTOR.
Ottmar Leuchs
BY

FIREPROOF SELF EXTINGUISHING COMPOSITION

This application is a continuation in part of application Ser. No. 823,033, filed May 8, 1969, now abandoned.

BACKGROUND OF THE INVENTION

In many polymeric compositions used in the arts, the polymer component thereof includes a functional group which upon being subjected to elevated temperatures, releases deleterious acid compounds into the atmosphere. Thus, for example, in the electrical industry, plasticized polyvinyl chloride is commonly used as an insulation or jacketing for electrical cables or conductors; and at elevated temperatures, the chlorine content thereof is converted to gaseous hydrogen chloride. The gaseous hydrogen chloride tends to extinguish any flames, and, consequently, the polyvinyl chloride compositions generally used for such applications, are flameproof. These compositions, however, are disadvantageous in that the evolved hydrogen chloride will combine with water or water vapor and corrode, destroy and/or impair any metal, masonry or other sensitive material in the vicinity of the evolved compounds.

These adverse effects are particularly serious in areas where highly sensitive metal elements such as switch contacts or other sensitive control equipment is present. Further, in confined areas, the evolved corrosive compounds may be present in amounts sufficient to prevent access to such areas for the purpose of extinguishing flames or the like.

Many disposable consumer items, such as plastic containers and the like, include, for example, polyvinyl chloride; and such items upon being disposed of after use, as by incineration, release hydrogen chloride into the atmosphere, thereby further polluting the atmosphere.

An object of this invention is to provide polymer compositions which are inhibited against the release of deleterious compounds into the atmosphere, when the compositions are subjected to elevated temperatures, despite the presence in the composition of a deleterious acid forming component.

Another object of this invention is to provide polyvinyl chloride compositions which are formulated to prevent the release of hydrogen chloride into the atmosphere when the compositions are subjected to elevated temperatures.

A further object of this invention is to provide flameproof compositions which are inhibited to prevent the release of deleterious acid compounds into the surrounding atmosphere upon being subjected to elevated temperatures.

Still another object of this invention is to provide polymeric jacketing and insulating compositions for electrical cables or conductors, which will not release deleterious acid compounds into the surrounding atmosphere when such cables or conductors are subjected to elevated temperatures.

These and other objects of the present invention should be apparent to those skilled in the art from reading the detailed description of the invention, with reference to the accompanying drawing.

DETAILED DESCRIPTION OF THE INVENTION

Figure 1:
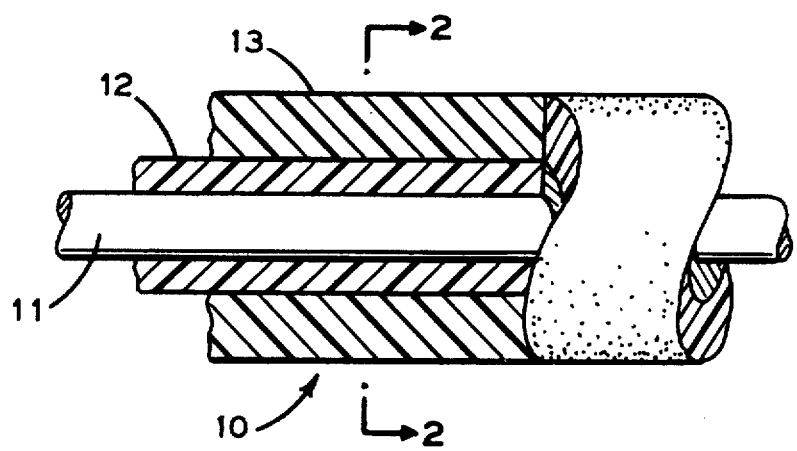
FIG. 1 is a longitudinal elevational view, with parts in section, showing an electrical conductor carrying a jacketing composition employing the invention.

The objects of this invention are broadly accomplished, in one aspect, by providing a polymer composition which includes a polymer which upon being subjected to an elevated temperature, evolves a deleterious acidic compound; and a material which is capable of combining with the deleterious acidic compound, the aforesaid material being present in an amount which is sufficient to combine with essentially all of the deleterious acidic compound to thereby prevent any evolution of the deleterious acidic compound in free form, into the surrounding atmosphere, when the composition is subjected to elevated temperatures.

More particularly, the polymer component of the composition, either as a homopolymer or a copolymer, includes a functional group which is released as a deleterious acidic compound upon subjecting the polymer to an elevated temperature; such deleterious acidic compound being one or more of the following: hydrogen bromide, hydrogen chloride, hydrogen fluoride, acetic acid and hydrogen cyanide.

As representative examples of polymers, which contain besides one or more hydrogen atoms, either a cyano, chloro, bromo, acetoxy or cyanide group which is released as the corresponding acidic compound upon being subjected to an elevated temperature, there may be mentioned: polyvinyl chloride, polyvinylidene chloride, poly vinyl acetate, polyvinyl acetate-polyvinyl chloride copolymer, polychloroprene, chlorinated natural and synthetic rubbers, chlorosulfonated polyethylene, chlorinated polyvinyl chloride, chlorinated polyethylene, polyacrylonitrile, acetylated cellulose, acrylonitrile-styrene copolymer, acrylonitrile-butadinene, styrene copolymer, brominated polymers, polyvinyl fluoride, polyvinylidene fluoride, and copolymers of vinylidene fluoride and perfluorinated olefins.

The material which is combined with the polymer is one which is capable of combining with the released acidic compound at the elevated temperature, to produce a compound which is non-deleterious at the elevated temperature, i.e., the resulting salt, at elevated temperatures, does not take the form of a deleterious material. Such materials are generally one or more of the following: carbonates, oxides, hydroxides and oxalates of calcium, barium, magnesium and strontium; carbonates of sodium and potassium; and the carbonate and oxide of lithium.

These materials react with the hereinabove described evolved deleterious acid compounds to produce a salt of the acid, thereby preventing the acid compound from being released to the surrounding atmosphere. For most applications, calcium carbonate is the preferred material in the light of its ready availability and ease in processing.

The material is present in the composition in an amount which is at least the stoichiometric quantity required to combine with essentially all of the deleterious acidic compound which could be released from the composition as a whole. The required stoichiometric amount of each of the materials may be readily calculated from the known amount of acid forming functional groups present in the polymers, and, therefore the stoichiometric amount of material required to insure essentially no release of deleterious acidic acompound into the surrounding atmosphere is dependent on both the material selected and the specific polymer component of the composition.

In most cases, the composition includes an amount of material which is in excess of the calculated stoichiometric amount, in that, such excess amount is required to insure no evolution of deleterious acidic compound into the surrouding atmosphere. The minimum amount of material required varies with the average particle size of the material; with materials having larger particle size requiring greater minimum stoichiometric excesses to combine with essentially all of the evolved deleterious acid compound. Stated in another way, the smaller the average particle size of the material, the closer the minimum amount of material required to combine witn essentially all of the evolved deleterious acidic compound, approaches the calculated stoichiometric amount of material.

For most applications, the average particle size of the material should not exceed 250 millimicrons, and preferably not in excess of 100 millimicrons. The selection of the minimum amount of material required to insure essentially no evolution of deleterious acidic compound for each polymer and for each material is deemed to be within the scope of those skilled in the art, from the teachings herein. The following are representative examples of various polymers and the calculated stoichiometric amount of calcium carbonate required to insure essentially no evolution of deleterious acidic compounds upon subjecting the polymer composition to an elevated temperature.

| Polymer | | Calcium Carbonate |
|---|---|---|
| polyvinyl chloride | 100 | 80 |
| polychloroprene | 100 | 56.5 |
| polyvinylidene chloride | 100 | 103 |
| polyvinyl fluoride | 100 | 109 |
| all parts by weight | | |

The polymer composition may contain, in addition to the particle material which prevents evolution of deleterious acidic compounds into tne surrounding atmosphere; other components which are conventionally included, as known in the art, such as plasticizers, stabilizers, colorants and the like, to provide the desired overall properties for the composition; provided the composition includes a sufficient amount of the hereinabove noted particle materials to combine essentially all of the deleterious acidic compound released into the surrounding atmosphere upon subjecting the composition to an elevated temperature.

The compositions of the present invention have a wide variety of applications in that the compositions may be effectively employed for anyone of diverse applications presently known in the art, with the added advantage that products formed from these compositions will not release deleterious acidic compounds into the surrounding atmosphere upon being subjected to elevated temperatures.

For example, polymeric compositions including polyvinyl chloride are presently employed as packages such as containers, trays, boxes and film wrapping. These disposable packages upon being incinerated, release hydrogen chloride into the atmosphere. By using the compositions of the present invention, which includes preferably calcium carbonate particles; the incineration of such packages releases essentially no hydrogen chloride into the atmosphere, the hydrogen chloride being bound in the ash.

Thus, when using calcium carbonate as the particle material of the composition, the hydrogen chloride which would have been released to the surrounding atmosphere, is converted to calcium chloride. The polyvinyl chloride composition is made up of a polyvinyl chloride which provides the desired mechanical properties, and the selected particle material. Such a composition may comprise by weight, 100 parts of polyvinyl chloride having a K value of from 50 to 75, and 100 or more parts of calcium carbonate having an average particle size of about 50 millimicrons. Articles made from such composition, after use, may be incinerated without the release of hydrogen chloride into the surrounding atmosphere.

There are many other applications for which compositions which include polymers of the type hereinabove described, should preferably not release deleterious acid compounds upon being subjected to elevated temperatures. For example, machinery and transport belts which are used in mines, factories and the like, upon being subjected to elevated temperatures as in the case of fire; present an additional hazard because of the release of deleterious acidic compounds of the type hereinabove described. The use of compositions of the instant invention for such belts, will eliminate the hazard.

Similarly, a wide variety of non-flammable or slow burning compositions, generally formed of polyvinyl chloride, may be improved in accordance with the teachings of the instant invention, by eliminating the additional hazard to men and materials presented by the release of hydrogen chloride incident to subjecting such compositions to elevated temperatures, as in a fire.

Thus, as should be apparent, the present invention is generally applicable to polymer compositions which include a polymer having a functional group which will be released in the form of a deleterious acidic compound, when the composition is subjected to elevated temperatures, as in the case of a fire or the like.

In the case of polyvinyl chloride, such elevated temperatures are in excess of 200° C. The temperatures at which various other poymers release deleterious acidic compounds are known in the art and therefore no detailed description in this respect is required.

The present invention is particularly suitable for the production of insulation or jackets for electrical conductors or cables; the same being derived from polyvinyl chloride which is suitable for both insulation and jackets; or polychloroprene which is used as a jacketing material. The polyvinyl chloride and polychloroprene used for such applications, generally are plasticized to provide desired mechanical properties. Although such plasticized compositions are self-extinguishing; these compositions at elevated temperatures arising from a fire or the like, release hydrogen chloride into the surrounding atmosphere.

In accordance with the instant invention, polyvinyl chloride or polychloroprene; and in particular, polyvinyl chloride, is combined with a non-flammable plasticizer, together with a particle material of the type hereinabove described, to thereby provide a self extinguishing composition which does not release hydrogen chloride into the surrounding atmosphere.

The particle material may be either calcium carbonate or barium carbonate; calcium carbonate being preferred. Carbonates of sodium or potassium are generally not suitable for these specific applications, in that, although these compounds would prevent the evolution of hydrogen chloride into the surrounding atmosphere, their hygroscopic properties would have an adverse effect on the electrical properties of the insulation or jacketing.

The particle material employed in the compositions of the instant invention, for combining with the hydrogen chloride otherwise evolved at elevated temperatures, must have an average particle size no greater then 250 millimicrons and generally no greater then 100 millimicrons. More particularly the average particle size is of the order of 10 to 100 millimicrons, although a range of 10 to 50 millimicrons and preferably, a range of 10 to 30 millimicrons, is preferred.

As previously indicated, such particle material is present in an amount which is at least sufficient to combine with essentially all of the evolved hydrogen chloride; i.e., the hydrogen chloride chloride evolved in the smoke is less then 1.5% and more generally, less then 1.0% calculated on the basis of 1 kilogram of polymer. With smaller average particle sizes, such minimum amount approaches the calculated stoichiometric amount.

The composition employed for forming insulation or jacketing for electrical usage, also includes a plasticizer to provide desired mechanical properties. Such plasticizer is generally present in an amount of from 30 parts to 80 parts per 100 parts of polymer, all by weight. The plasticizer component of the composition may be made up of one or more compounds which are used with polyvinyl chloride or polychloroprene; such plasticizers being preferably non-flammable to provide a self-extinguishing composition.

The non-flammable plasticizer included in such compositions, is preferably an aromatic phosphate, such as tricresyl phosphate, diphenyl cresyl phosphate, dicresyl phenyl phosphate, triphenyl phosphate, trixylenyl phosphate, and mixtures thereof, It is understood that mixed aliphatic-aromatic phosphates may also be employed, such as diphenyl nonyl phosphate and the like. However, the substitution of an aliphatic group for an aromatic group reduces the overall non-flammable properties of such plasticizers. The use of the specified non-flammable plasticizers and others known in the air, is deemed to be within the knowledge of those skilled in the art, taken with the teachings herein.

In some cases, the plasticizer component of the composition may include a flammable plasticizer, in which case the composition may or may not be self-extinguishing. Such flammable plasticizers include phthalates such as dioctyl phthalate, dinonyl phthalate, didecyl phthalate and mixtures thereof.

The preferred compositions for electrical applications, i.e., as insulation and/or jacketing, preferably comprise polyvinyl chloride or polychloroprene; a non-flammable plasticizer, preferably a tri-aromatic phosphate of the type hereinabove described; and calcium or barium carbonate, preferably calcium carbonate. The composition generally also includes stabilizers, lubricants and other known components.

A particularly preferred composition is one which contains calcium carbonate in an amount of 100 parts per 100 parts of polvinyl chloride, preferably 120 parts of calcium carbonate per 100 parts of polyvinyl chloride; with the calcium carbonate having an average particle size of 50 millimicrons, and preferably 30 millimicrons or less.

The following examples are illustrative of the instant invention, but are not to be deemed in limitation thereof.

| | Examples | | | | | |
|---|---|---|---|---|---|---|
| | 1 | 2 | 3 | 4 | 5 | 6 |
| polyvinyl chloride | 100 | 100 | 100 | 100 | 100 | 100 |
| plasticizer A | 50 | 63 | 63 | 35 | 35 | |
| plasticizer B | | | | | 30 | 70 |
| milled chalk | | 60 | | | | |
| precipitated chalk | | | 60 | 60 | 100 | 120 |
| stabilizers | 11 | 5 | 5 | 5 | 11 | 10 |
| after burning time in seconds | 5 | 13 | 60 | 0 | 0 | 0 |
| % hydrogen chloride evolved | 100 | 60 | 21 | 20 | 0 | 0 |

Plasticizer A is of the phthalate type such as diisooctyl phthalate, octyl phthalate, butyl octyl phthalate, and the like. Plasticizer B is of the aromatic phosphate type such as tricresyl phosphate, dicresyl phenyl phosphate, and more particularly, as in Example 6 above, diphenyl cresyl phosphate.

The milled chalk is of conventional type, having an average particle size substantially greater then 250 millimicrons. The precipitated chalk has an average particle size of about 50 millimicrons. The stabilizers are of the usual type found in polyvinyl chloride compositions, such as barium-cadmium laurate complexes.

It will be apparent that in the case of Example 1, containing no chalk, the total hydrogen chloride is liberated when the composition is subjected to elevated temperatures sufficient to effect a decomposition of the polymer. The use of milled chalk, Example 2, gives some reduction in evolved hydrogen chloride.

However, when the milled chalk is replaced by precipitated chalk having an average particle size of about 50 millimicrons, as in Examples 3–6; the evolved hydrogen chloride is materially reduced; and in Examples 5 and 6, is reduced to zero, making such compositions acceptable for electrical applications.

In another example 7, 100 parts of polyvinyl chloride was combined with 70 parts of diphenyl cresyl phosphate, 120 parts of calcium carbonate having an average particle size of 30 millimicrons and 12 parts of stabilizer of the barium-cadmium laurate complex type admixed with epoxy compounds. When this composition was subjected to elevated temperatures, released hydrogen chloride was less then 1% over a range of temperatures up to 650° C; the percentages being calculated on the weight of polymer used.

In a further example 8, 100 parts of polyvinyl chloride was combined with 70 parts of diphenyl cresyl phosphate, 237 parts of barium carbonate having an average particle size of 70 millimicrons, and 12 parts of stabilizer of the bariumcadmium laurate type admixed with epoxy compounds. When this composition was subjected to elevated temperatures in excess of 200° C, the released hydrogen chloride was less then 1% calculated on the weight of polymer. In the foregoing examples, the parts are by weight.

Figure 2:
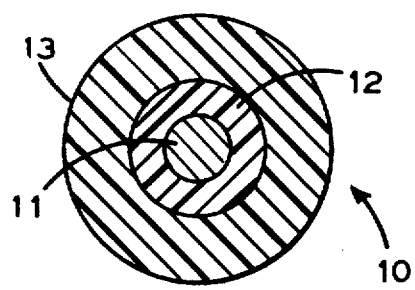
FIG. 2 is a transverse sectional view taken on the line 2—2 of FIG. 1.

The compositions of the instant invention, where the particle matter is of very small average particle size and is present in amounts surpassing the calculated stoichiometric amounts required; are particularly applicable for electrical usage. Thus, as shown in FIGS. 1, 2; an electrical cable 10 comprises a conductor 11 of copper or aluminum and an insulating layer 12 therefor of normally plasticized polyvinyl chloride or vulcanized rubber.

A sheath or jacket 13 is extruded over insulation 12, such jacket being made of a composition as set forth in Example 6. It is understood that insulation 12 may also be made of a polyvinyl chloride composition as in Examples 5 or 6.

A comparison of the properties of a conventional polyvinyl chloride jacket A, and a polyvinyl chloride jacket B made in accordance with Example 6, follows:

|  | A | B |
|---|---|---|
| hydrogen chloride lost in smoke after 30 min. at 650 ° C, using 50 liters/hr. of dry air, in grams/kg. polymer | 201 | 1 |
| hydrogen chloride lost in smoke after 30 min. at 650 ° C, using moist air with 8.7 g. water/cu. meter, in grams/kg. polymer | 215 | 1 |
| Oxygen index % | 23.3 | 27.7 |

It will be apparent that polymer compositions of the instant invention have a wide variety of applications, particularly because of the unique combination of self-extinguishing behaviour with a smoke free of hydrogen chloride or other deleterious acidic compounds.

While such compositions are of special interest as insulation and jacketings for electrical cables and conductors; these compositions are also attractive for making floor tile, packaging and containers of all sorts, sheet plastic and film, laminates of various kinds, and molded products generally.

I claim:
1. A fireproof self extinguishing composition, comprising:
    a polymer which evolves hydrogen chloride at temperatures encountered in a fire; a plasticizing amount of a non-flammable plasticizer; and a material selected from the group consisting of the carbonates of calcium, barium, magnesium, strontium, sodium, potassium, lithium and mixtures thereof, said material having an average particle size which does not exceed 250 millimicrons and being present in an amount which is at least sufficient to combine with essentially the entire amount of hydrogen chloride which is evolved at temperatures which occur in a fire to thereby prevent evolution into the surrounding atmosphere of the hydrogen chloride when the composition is subjected to said temperatures.

2. The composition as defined in claim 1 wherein said material is barium carbonate.

3. The composition as in claim 1 wherein said material is sodium carbonate.

4. The composition as in claim 1 wherein said material is potassium carbonate.

5. The composition of claim 4 wherein the material is calcium carbonate.

6. The composition of claim 5 wherein the polymer is polychloroprene.

7. The composition of claim 4 wherein the polymer is polyvinyl chloride.

8. The composition of claim 4 wherein the nonflammable plasticizer is an aromatic phosphate plasticizer.

9. The composition of claim 8 wherein the material is calcium carbonate.

10. The composition of claim 9 wherein the polymer is polyvinyl chloride.

11. The composition of claim 9 wherein the polymer is polychloroprene.

12. The composition of claim 1 wherein the plasticizer is present in an amount from about 30 parts to about 80 parts per 100 parts of the polymer, all by weight.

* * * * *

UNITED STATES PATENT OFFICE
CERTIFICATE OF CORRECTION

Patent No. 3,943,087          Dated March 9, 1976

Inventor(s) Ottmar Leuchs

It is certified that error appears in the above-identified patent and that said Letters Patent are hereby corrected as shown below:

IN THE SPECIFICATION:

Column 1, line 16, "insulationor" should be -- insulator -- ;

Column 3, lines 4 & 5, "acompound" should be -- compound -- ;

Column 3, line 20, "witn" should be -- with -- ;

Column 3, line 48, "tne" should be -- the -- ;

Column 4, line 50, "poymers" should be -- polymers -- ;

Column 5, line 25, after "hydrogen chloride" delete "chloride" ;

Column 5, line 52, "air" should be -- art -- ;

Column 6, line 3, "polvinyl" should be -- polyvinyl -- ;

Column 6, line 63, "bariumcadmium" should be -- barium-cadmium -- .

IN THE CLAIMS:

Claim 5, change dependency from "Claim 4" to -- Claim 1 -- ;

Claim 7, change dependency from "Claim 4" to -- Claim 5 -- ;

Claim 8, change dependency from "Claim 4" to -- Claim 1 -- .

Signed and Sealed this twenty-second Day of June 1976

[SEAL]

Attest:

RUTH C. MASON
Attesting Officer

C. MARSHALL DANN
Commissioner of Patents and Trademarks